United States Patent [19]

Tartaglione

[11] Patent Number: 4,851,062

[45] Date of Patent: Jul. 25, 1989

[54] METHOD OF MAKING AND DECORATING A PLASTIC CONTAINER HAVING A NECK

[76] Inventor: André Tartaglione, 20 rue Ampére, Oyonnax, France

[21] Appl. No.: 155,241

[22] Filed: Feb. 12, 1988

[51] Int. Cl.4 .................. B32B 31/04; B29D 23/02
[52] U.S. Cl. .................................. 156/69; 53/471; 53/477; 53/478; 53/481; 101/DIG. 39; 156/198; 156/245; 156/277; 156/294; 264/132
[58] Field of Search ............... 53/467, 468, 471, 477, 53/478, 481; 101/DIG. 16; 156/69, 198, 277, 245, 294; 264/132

[56] References Cited

U.S. PATENT DOCUMENTS

| | | | |
|---|---|---|---|
| 3,082,686 | 3/1963 | Taylor | 101/DIG. 16 X |
| 3,172,571 | 3/1965 | Marchak | 264/132 X |
| 3,504,067 | 3/1970 | Trecek | 264/132 X |
| 4,430,142 | 2/1984 | Ochi et al. | 156/69 X |
| 4,511,416 | 4/1985 | Karpiloff | 156/69 |

Primary Examiner—Robert A. Dawson
Attorney, Agent, or Firm—Herbert Dubno

[57] ABSTRACT

A method of making and decorating a container in which the tubular body is injection molded with either its upper end or its bottom end open and is threaded onto a mandrel through an open end to provide support for the tubular body during printing of a decor thereon. The neck member or bottom member or both can then be applied.

14 Claims, 2 Drawing Sheets

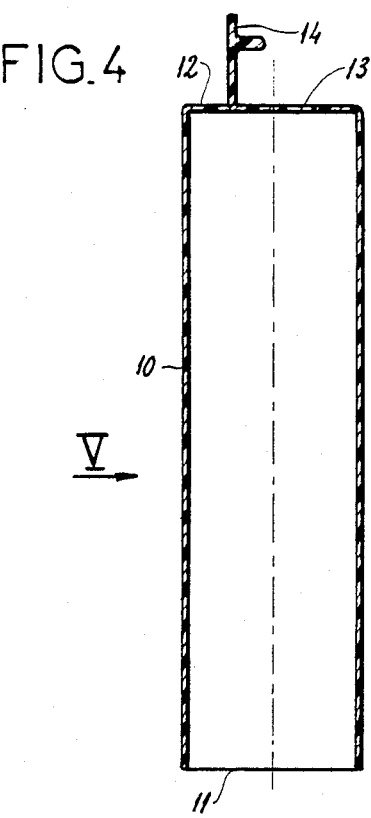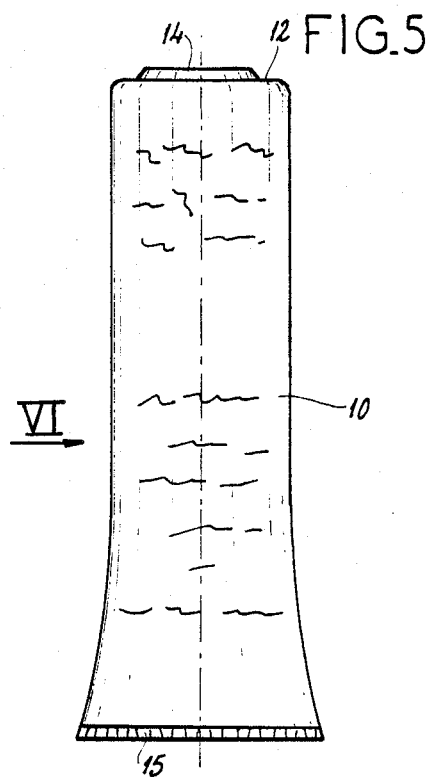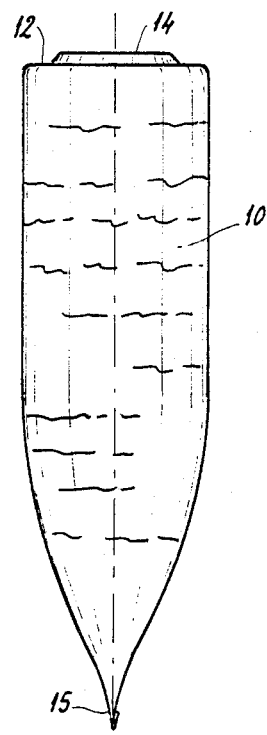

METHOD OF MAKING AND DECORATING A PLASTIC CONTAINER HAVING A NECK

FIELD OF THE INVENTION

My present invention relates to a method of making and decorating a plastic (synthetic resin) and especially a thermoplastic container having a neck. More particularly, the invention relates to the fabrication of bottle-type containers having neck and bottom members, the neck member being formed with a screwthread or other formation adjacent a mouth of the container to permit a cap to be applied to the container.

BACKGROUND OF THE INVENTION

It is known to form containers of the above-described type for use as bottles for cosmetics and pharmaceuticals, for example, utilizing a combined injection and blow molding or combined extrusion and blow-molding technique.

For example in the extrusion-blow-molding method, the parison which is vertically extruded is fed upwardly into a two-part mold which is then closed on the parison. The parison is then expanded by blowing to assume a shape complementary to that of the mold cavity.

The top of the neck is then cut away and the bottle formed in the mold is removed by the opening of the latter in a separation of the two mold parts so that the completed bottle can fall onto a receiving bin or can be deposited on a conveyor which can carry off the bottle from the blow-molding machine.

As will be described in greater detail below, blow-molded bottles formed in this manner generally have a seam extending around the bottle in a plane corresponding to the joint plane or separation plane of the two mold halves. When an attempt is made to imprint such a bottle, the seam tends to interfere with the print rendition so that an apparent defect is created where the print overlies the joint plane.

To avoid this drawback, the bottle may be printed with a positioning recess or other formation which serves to index the bottle in a proper position in the printing machine so that when the print pattern is applied, it need not overlap or extend beyond the joint plane and hence the seam.

Thus it is necessary to provide each bottle with an indexing or positioning formation and generally it is necessary to check the finished product for failure in alignment of the decor with the surfaces of the bottle free from the seams. These requirements complicate both the printing apparatus and the printing process.

Furthermore, plastic bottles fabricated in the above-mentioned manner have relatively limited rigidity and thus tend to deform under action of a printing roller or blanket if one does not apply air under pressure to the interior of the bottle during printing. The need for delivery of compressed air to the bottle complicates the printing apparatus.

Finally, the fact that injection-blow-molding and extrusion-blow-molding processes tend to produce products which do not have a high degree of uniformity in wall thickness must be mentioned.

This, of course, poses a problem not only in printing but with respect to the appearance of the bottle, the filling thereof and the uniformity of strength thereof.

OBJECTS OF THE INVENTION

It is the principal object of the present invention to provide a method of fabricating and decorating a container having a neck, especially a bottle composed of a synthetic resin material, whereby the above-mentioned disadvantages are eliminated.

Another object of this invention is to provide a method of making and decorating a necked plastic container which can utilize equipment which is comparatively simple and free from the complexities of prior art equipment.

Still another object of the invention is to provide an improved method of making and decorating a bottle which is of more uniform wall thickness than has been the case with blow-molded bottles and the like.

SUMMARY OF THE INVENTION

These objects and others which will become apparent hereinafter are attained, in accordance with my present invention which provides a method of making and decorating a plastic container having a neck and referred to hereinafter also as a plastic bottle.

Specifically, the method of the invention is directed to the formation of a bottle which has not only a neck member forming a mouth of the bottle, a tubular body extending from and connected to the neck member, and a bottom member closing the end of the tubular body remote from that at which the neck member is provided.

In the process of the invention, the tubular body is injection molded from thermoplastic without at least one of these members so that the tubular body is open at the corresponding end. For decoration of the bottle, therefore, the tubular body is threaded onto a support mandrel and on this support mandrel is brought into contact with a printing roller or blanket. Following application of the decor, the neck member or the bottom member, or both, formed by injection molding from thermoplastic separately from the tubular body can be applied to that tubular body by thermal bonding, ultrasonic fusion or even solvent bonding, if appropriate.

Of course, when the tubular body is injection molded unitarily (in one piece) with the neck member, the bottom member can be formed by simply welding the open end of the tubular body closed in the manner of a flexible tube of the type commonly used for dispensing pastes and viscous materials.

BRIEF DESCRIPTION OF THE DRAWING

The above and other objects, features and advantages of the present invention will become more readily apparent from the following description, reference being made to the accompanying drawing in which:

FIG. 4 is a longitudinal section through the injection-molded bottle blank before printing, filling and sealing;

FIG. 5 is an elevational view in the direction of the arrow V of FIG. 4 after printing, filling and sealing; and FIG. 6 is an elevational view in the direction of arrow VI of FIG. 5.

SPECIFIC DESCRIPTION

Figure 1:
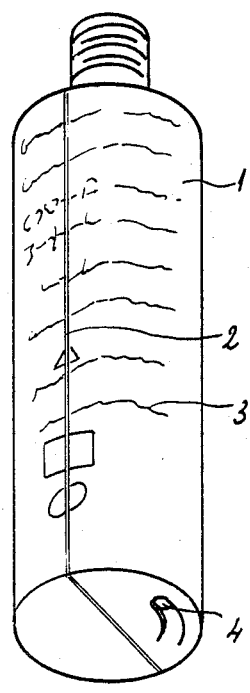
FIG. 1 is a bottom perspective view of a bottle fabricated by prior art techniques.

FIG. 1 shows the prior art blow-molded bottle described previously with its continuous seam 2 along the joint plane.

The bottle 1 is provided with an improved decor or motif 3 which can run over the seam 2 and thus appears to have a defect in printing as a result of the pronounced irregularity formed by the seam. To assure proper registry of the decor, the bottom of the bottle can be formed with a recess 4 constituting an indexing or registration formation cooperating with the printing machine. Neither this formation nor the seam is present in the bottle fabricated in accordance with the invention.

Figure 2:
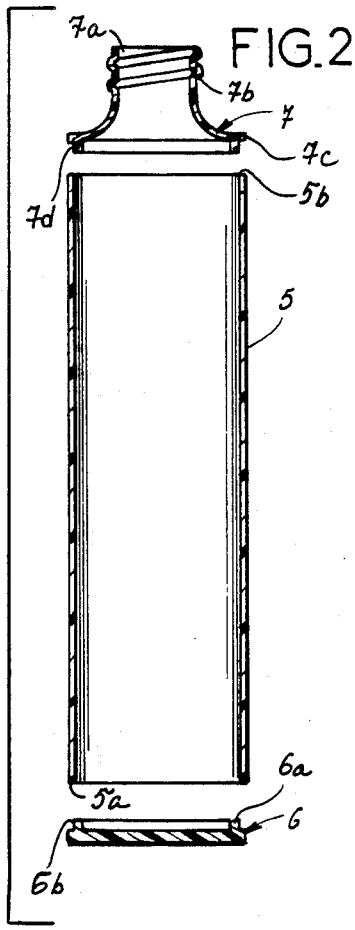
FIG. 2 is a longitudinal section through the elements of a bottle fabricated in accordance with the present invention and in the course of assembly.

Turning to FIG. 2, it can be seen that the bottle of the invention can be made up of a cylindrical tubular body 5, a bottom member 6 and a neck member 7, all formed by injection molding. The injection molding technique ensures that the thicknesses of the three elements can be uniform and, of course, eliminates any joint plane.

In a modification of the invention, only the tubular bottle 5 is formed by injection and the two other elements 6 and 7 are made by other techniques.

Figure 3:
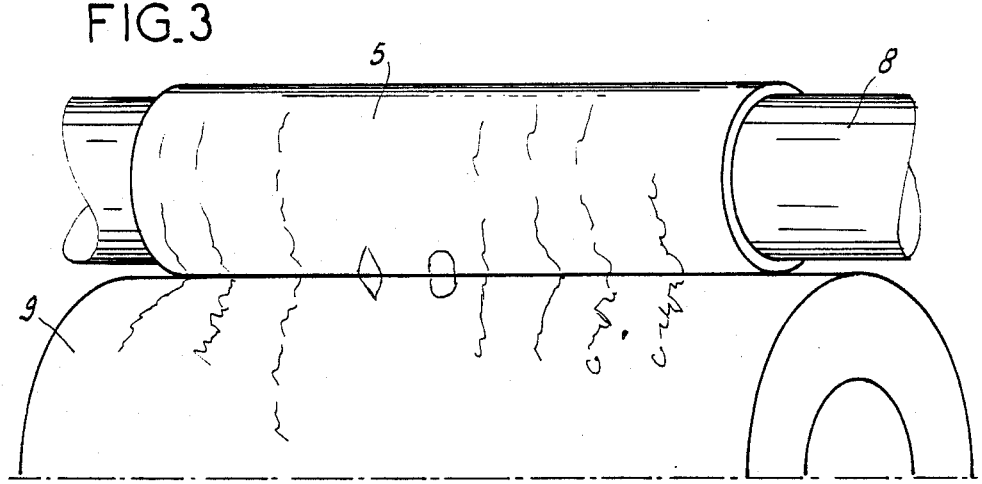
FIG. 3 is a diagrammatic perspective view in highly simplified form illustrating the imprinting of a decor on the tubular body of the bottle.

In the embodiment illustrated in FIGS. 2 and 3, where the tubular body 5 is open at both of its ends, it can be threaded easily onto the mandrel 8 which supports the tubular body 5 for printing against the printing roll 9. Alternatively, either the neck member 7 or the bottom member 6 may be molded unitarily with the tubular body 5, in which case the tubular body is threaded onto the mandrel 8 which then does not extend through the tubular body, from the open end.

After printing, the remaining member or members can be applied. For example, the bottom member 6 may have a rib 6a which extends into the tubular body 5 and adjoins a ledge 6b against which the end 5a of the tubular body 5 abuts. Similarly, the neck member 7 can have a mouth 7a adjacent which a screwthread 7b is formed to receive a removable cap. A ledge 7c abuts the end base 5b of the tubular body 5 and adjoins a ridge 7d which projects into the tubular body in a tight fit therewith. After printing and assembly, e.g. by adhesive or solvent bonding, the welding technique or clipping, the bottle may be filled and capped. Of course the members 6 and 7 can be molded with threads and screws connected to the body 5 which may be molded with mating threads if desired.

It is also possible to form a container (see FIGS. 4–6) which has its bottom member formed by a weld seam 15 after it has been pinched closed.

To this end, the container is injection molded with a cylindrical body 10 totally open at 11 at its base and having its upper member 12 formed as a circular opening 13 equivalent to a neck and adjoining which a cap 14 is integrally molded so that it can be bent down to close the hole 13 and has its junction with the member 12 formed as a plastic or foil hinge.

The body 10 is then threaded onto a mandrel as has been described in connection with FIG. 3 and imprinted.

When the printing has been completed, the orifice 13 is closed by the plug or tongue and the tube 10 is inverted and filled through this open bottom 11. Upon filling, the bottom end of the tube is pinched closed and the weld seam 15, previously described, is formed in the usual manner. The result is a container (see FIGS. 5 and 6) which has generally the appearance of a conventional squeeze tube for viscous material, such as toothpaste or shampoo.

It will be apparent that the invention is not limited to the specific embodiments described and that modifications may be made within the spirit and scope of the appended claims. For example, the tubular body need not have a purely cylindrical shape but can have other shapes such as elliptical, frustoconical or polygonal shapes.

In the casein which a bottle is to be produced, the neck member or the bottom member may be formed in one piece with the body 5 and the other member assembled onto the body following printing.

The important advantage of the process of the invention is that the different elements which are assembled, for example, the elements 5, 6 and 7, can be injection molded from plastics of different colors to obtain bottles with different esthetic effects.

The invention is applicable to all kinds of containers whether or not they represent bodies of revolution, although the cylindrical shape is preferred. The invention is, for example, applicable to parallelepipedal containers of square, rectangular or triangular cross sections.

The different elements 5, 6 and 7 which are assembled can be made of different types of plastic as well and thus one can provide generally similar containers with a variety of different necks.

The body 5 can, in addition, be formed with one or more lateral or vertical partitions. The neck can have an integral cap or plug which can be of a simple type or of a complex type and which can be a tear-away type forming a safety closure preventing contamination of the contents of the bottle. A dosing pump can also be built into the neck.

I claim:

1. A method of making and decorating a container comprising the steps of:
   (a) injection molding a tubular body adapted to have a neck member at one end and a bottom member at an opposite end without at least one of said members so that said tubular body is open at the corresponding end;
   (b) threading said tubular body onto a support mandrel from said corresponding end so that said mandrel extends substantially over the entire length of said tubular body;
   (c) printing a decor on said tubular body while said tubular body is supported by said mandrel; and
   (d) closing said corresponding end of said body by the formation of the corresponding one of said members thereon upon removal of the mandrel from said body.

2. The method defined in claim 1 wherein said corresponding member is said neck member and is formed separately from said body, step (d) comprising bonding said neck member onto said body.

3. The method defined in claim 1 wherein said corresponding member is said bottom member and is formed separately from said body, step (d) comprising bonding said bottom member onto said body.

4. The method defined in claim 1 wherein one of said members is formed unitarily with said body by injection molding in step (a).

5. The method defined in claim 1 wherein both of said members are formed separately from said body and are bonded thereto in step (d).

6. The method defined in claim 1 wherein said corresponding member is affixed to said body in step (d) by adhesive bonding.

7. The method defined in claim 1 wherein said corresponding member is affixed to said body in step (d) by adhesive welding.

8. The method defined in claim 1 wherein said corresponding member is affixed to said body in step (d) by mating screwthreads formed on said body and said corresponding member.

9. The method defined in claim 1 wherein said corresponding member has a color different from that of said body.

10. The method defined in claim 1 wherein said corresponding member is composed of a different kind of plastic from that constituting said body.

11. The method defined in claim 1 wherein said corresponding member is said bottom member and is formed by pinching the corresponding end of said tubular body and welding the pinched end closed.

12. The method defined in claim 11 wherein said neck member is formed with said body by injection molding in step a and has an opening closable by a tongue formed integrally with said neck member by injection molding.

13. The method defined in claim 12 wherein said tongue is caused to close said opening and said body is inverted to fill the container through the open end of said tubular body before said open end is pinched closed and welded.

14. The method defined in claim 1 wherein said neck member is formed with a screwthread for receiving a cap.

* * * * *